Patented Feb. 12, 1924.

1,483,469

UNITED STATES PATENT OFFICE.

ALBERT P. MEYER, OF PITTSBURGH, PENNSYLVANIA, ASSIGNOR TO ALLEN S. DAVISON COMPANY, OF PITTSBURGH, PENNSYLVANIA, A CORPORATION OF PENNSYLVANIA.

BASIC REFRACTORY AND PROCESS OF MAKING SAME.

No Drawing. Application filed January 25, 1922. Serial No. 531,765.

*To all whom it may concern:*

Be it known that I, ALBERT P. MEYER, a citizen of the United States, residing at Pittsburgh, in the county of Allegheny and State of Pennsylvania, have invented certain new and useful Improvements in Basic Refractories and Processes of Making Same, of which the following is a specification.

This invention relates to basic refractories and processes of making same; and it comprises a new material for lining basic open hearth furnaces composed of individually fired and compacted angular grains, each composed of an intimate and uniform admixture of a magnesian refractory material with a binder; and it also comprises a method of making this material wherein finely powdered dolomite is brought to a standardized composition as regards fluxing impurities, the mixture is compacted into a cake by pressure (advantageously in the presence of water) and dried, the dried material is broken into angular granules and the angular granules fired in a rotary kiln at a high temperature; all as more fully hereinafter set forth and as claimed.

In a basic open hearth furnace, the bottom is covered with a granular layer or bed of basic refractory material, this lining extending upward beyond the slag line to form a basin-shaped hearth in which the molten iron and molten slag are contained. Although made of granular material, the bed as a whole must have a considerable degree of coherence, rigidity and mechanical strength in order to stay in place and retain its shape; and this in turn requires that the granules composing it shall adhere or bond among themselves with considerable tenacity. These requirements are in a measure conflicting, since while the bed must not fuse or soften materially at any furnace temperature, yet the individual granules must yield to the heat sufficiently to develop a certain amount of superficial stickiness or adhesiveness; enough to cause them to bond when pressed together. And in this respect, the properties of the refractory necessarily represent a sort of compromise.

Magnesia and magnesian lime (burnt dolomite) are the materials generally used, but neither is applicable in a pure state, being then entirely too refractory. The presence of more or less "impurity" is necessary to act as a sort of fluxing or bonding agent, diminishing the refractoriness somewhat and permitting development of bond at open hearth furnace temperatures. Iron oxid, alumina and silica are the impurities generally found in this class of materials and all three have a fluxing power on magnesia. It is, however, difficult to find material with the right amount of impurity, neither more nor less, in intimate association therewith. With too little, the refractory will not bond; with too much, it yields under the heat of the furnace. For many years, the standard material has been certain grades of Austrian magnesite; a native magnesium carbonate containing small amounts of impurity distributed therethrough in a fine state of subdivision. The material occurs in seams or bodies of varying composition and to obtain the commercial article the product of the quarries is hand picked; fragments of undue purity or impurity being discarded. The selected material is, naturally, not very uniform.

Dolomite or magnesian limestone, though often proposed for lining open hearth furnaces, was but little used until the war shut off importation of magnesite. There are many extensive deposits in this country but none, so far as known, carrying the intimately disseminated impurity characterizing the imported magnesite and capable of being used in the same way. As the rock occurs, it is rarely pure, but the impurities are localized. In cracking dolomite and screening, the fines carry much more of the impurities than the overscreen material, showing the impurities to be largely contained in fissures, etc. However, the rock in many instances, can be crushed, screened and hard burnt and shrunk in a rotary kiln to give a material which can be used for patching open hearth furnace linings though not for new bottoms. But it suffers from the defect of not being stable. It contains lime in large amounts and slaking and crumbling are inevitable in shipping and storing. Even for the limited use mentioned it is not applicable unless it goes directly from the kiln to the furnace. The only dolomite preparation satisfactory for linings as well as patchings and stable under atmospheric influences, is made by a quite special procedure in which crushed rock is screened and the fragments hard burnt and shrunk in a rotary kiln in connection with a comparatively fusible material like basic slag which, under the conditions afforded, will be taken up by the rock fragments, coating and impregnating them; acting both as a protection against slaking and, in the furnace, as a bonding agent. These angular crushed rock fragments, being flat surfaced and sharp edged, in the furnace give a very satisfactory mechanical interlock: this being one reason the material is liked for linings.

Very many efforts have been made with dolomite as a material to make other preparations analogous to and capable of replacing the imported magnesite, but with no great success. In a general way, in these propositions the dolomite is reduced to a fine powder, intimately mixed with a bonding agent, such as iron oxide and then fired in a rotary kiln of the type of those used in making Portland cement.

The pulverulent mixture, if of the right composition for open hearth furnace purposes, is composed of highly refractory particles and these do not interact to any great extent in the time and at the temperature afforded in this kiln firing, not sufficiently so to give the hard, dense material wanted. Dolomite and oxide of iron, being of quite different specific gravity, there is a tendency to segregate as the particles tumble slowly down the kiln; and such sintering or clinkering as takes place is where there is a local enrichment in flux. Sometimes the powders are wetted and converted into slurries but this does not avoid the difficulty, since slurries will not uniformly feed down a kiln. Part of a slurry is dried before other parts, and the ultimate composition is not uniform. The product coming from the kiln is rounded or balled open-textured aggregates of imperfectly united particles.

In the open hearth furnaces a ball shape, or any substantial roundness of the granule, is quite objectionable; first, because it does not give the mechanical interlocking which is neccesary for a firm bed and which can be secured with angular granules, and, secondly, because the granules roll more or less when pitched into place. In the furnace, repairs are most frequently required at the slag line; and in pitching round-grained material into place across the furnace, it is hard to prevent a considerable proportion of the grains rolling down on the bottom of the furnace. Sometimes it is necessary to shut down the furnace to cut down bottoms built up in this way.

In the persent method, I have modified this procedure by adding an intermediate step, securing a hard, firm, dense and angular shaped granule before firing. The fine ground dolomite and bonding agent are formed into a hard cake with the aid of water and pressure and this cake is then broken up to give angular, flat faced and sharp edged fragments; these fragments representing the final granules. The fragments are freed of fines by screening and are then fired in a rotary kiln at a high temperature. With the use of plenty of water and a final fairly high pressure, say, 150 pounds, in expression, the particles can be brought into mutual approximation with large area contact therebetween; a contact sufficient to ensure efficient action during the progress of the material down the kiln. The action is one which it is impossible to accomplish where the two components go through the kiln together as, so to speak, separate powders. There is no tendency to form rounded aggregates or nodules; the granules come out as sharp angled as they enter and they are thoroughly shrunk and hardened, being given an exceptionally dense character and fire hardened surfaces. The product is stable in the air, not slaking or breaking down in shipment or storage.

The action of the water develops what may be called a temporary bond in pressing with formation of a hard, dense cake. The greater the pressure and the finer the grinding, the denser and harder is the cake which can be made. If the material is ground so that all will pass a 100 mesh, much of it of course is much finer; and it is probable that colloid phenomena contribute to the formation of the bond and of the dense cake. The cake breaks with a somewhat conchoidal fracture and the granules are sharp edged and have slightly curvilinear, practically flat faces; and this shape persists in the firing. Ordinarily, I screen to obtain granules of about $\frac{1}{16}$ inch. Such fines as are produced go back to the grinder, so there is no loss from this source.

Granules made in this way are, of course, absolutely uniform in composition; each granule is exactly like every other granule. In this respect, the present material has an advantage over the Austrian magnesite which is more or less irregular in composition. The firing in the kiln is advantageously at 2800° to 3000° F., or a temperature as much higher as can be secured. The higher the temperature, the more thoroughly the material is shrunk and condensed. Any of the usual firing means adapted for high temperatures may be used. A kiln 160 feet long and 6 feet in internal diameter has proved satisfactory. Powdered coal or natural gas may be used for firing. It is advantageous to use preheated air.

The fine grinding of the materials is advantageously as high as 100 mesh and it may be much higher. Either wet or dry grinding may be employed, but I find wet grinding better. The dolomite may be employed in the raw or in the calcined state. Ordinarily, I use the raw material.

In producing material of standardized composition, it sometimes happens that the run-of-quarry dolomite on fine grinding and averaging by mixing will give the correct analysis; more frequently, this composition can be produced by mixing adjusted proportions of material from different seams and of different analysis. In crushing and screening dolomite for other purposes, the fines are, as stated, richer in bonding agents than the rest of the rock; and sometimes a portion of the fines so produced can be used in furnishing bonding agent for the present purposes. But commonly it is better to take a rather pure rock and get the composition wanted by a special addition of fluxing agent, such as oxid of iron, basic slag, etc. In so doing, it is easy to obtain an exact composition. Many materials may be used for such additions, such as clay, iron ore, basic slag, other slags, etc., and convenience will usually dictate the selection. Whatever the material added, the amount should be such as to make, with the impurities naturally present, a total of about between 8 and 17 per cent in the burnt product, these figures being representative of the best proportions I have so far found. But I may use as little as 4 per cent or as much as 25 per cent in special instances, depending upon the ultimate use of the product. Since dolomite loses about half its weight in firing, the proportion in the raw mix is about half as great as stated. It is best, as I have so far found, to have all three fluxing agents present and the best ratio between iron oxid, silica and alumina is something like 7:7:2.

Dolomite treated in this way gives a product which is of more uniform composition than Austrian magnesite and of better quality. It is a standardized product.

I regard my invention as covering the production of a granular dolomitic refractory composed of small individually fired angular granules of uniform nature and each of standardized composition.

If the material has been dry ground, I add to it enough water to bring it to a mud or slurry. Wet ground material usually requires a further addition of water to get it thin enough for my purposes. In the present process this water acts as a lubricant and facilitates producing intimate contact of the particles in pressing. Ordinarily, I next pump this thin material into an apparatus of the type of an ordinary filter press, pumping under heavy pressure, say, 150 pounds per square inch. The watery magma may be thickened in the commercial "thickeners" and then subjected to pressure in a brick press, but this is less convenient and satisfactory. After forming this cake, I remove it from the apparatus and break it up more or less. I then dry it, either by exposure to the air or by artificial heat until it becomes hard and rigid. It is then broken up by a jaw press or in other suitable means to give an angular product. Fines separated by the screens are sent back for reuse in the process.

In another application, Serial No. 531,764, filed January 25, 1922, I describe and claim the production of a basic magnesian refractory using magnesite or magnesia as the initial material; and this matter I do not specifically claim herein.

It is sometimes advantageous to add a little lime or dolomite lime to the mixture of fine ground dolomite and bonding agent; say five or ten per cent or so. The addition of a little lime often adds materially to the strength of the temporary bond, and with some types of dolomite it is highly advantageous. Where magnesia is available it may be used in lieu of lime.

What I claim is:—

1. As a new basic refractory for open hearth furnaces, a granular aggregation of sharp edged, flat faced, hard, dense individually fired granules of a mixture of dolomite and bonding agent, the several granules being of uniform composition and the amount of bonding agent being sufficient to permit bonding of the granules at the temperatures of an open hearth furnace.

2. The process of making a basic refractory which comprises fine grinding dolomite, admixing with a small amount of bonding agent with the aid of water to produce intimate incorporation and standardized composition, pressing to produce a hard cake, breaking up the cake into angular granules and firing the granules at a high temperature to shrink and harden the same.

3. The process of making basic magnesian refractories for basic open hearth furnaces which comprises mixing dolomite in finely subdivided form with sufficient bonding agent to establish a predetermined ratio therebetween, forming the mixing into a hard cake, breaking said cake to make angular granules, screening out any fines produced in breaking and firing the granules to shrink and harden the same.

4. The process of producing granular basic refractory materials which comprises preforming granules of substantially the ultimate shape of the finished product from dolomitic materials and a bonding agent, which when heated to a high temperature will burn to the ultimate chemical composition of the refractory desired, and firing such preformed granules individually and en masse to burn such granules and shrink to the ultimate size desired without mutual reaction of the granules during firing.

5. The process of making a basic refractory which comprises fine grinding dolomite, admixing the fine ground dolomite with a small amount of bonding agent and with a little lime in the presence of water to produce intimate incorporation and standardized composition, pressing to produce a hard cake, breaking up the cake into angular granules and firing the granules at a high temperature to shrink and harden the same.

In testimony whereof, I have hereunto affixed my signature.

ALBERT P. MEYER.